US010612987B2

(12) United States Patent
Atkins et al.

(10) Patent No.: US 10,612,987 B2
(45) Date of Patent: Apr. 7, 2020

(54) SYSTEM FOR MONITORING CHARACTERISTICS OF A LOAD-BEARING ROTATING SHAFT

(71) Applicant: Bell Helicopter Textron Inc., Fort Worth, TX (US)

(72) Inventors: Brady Garrett Atkins, Euless, TX (US); Alexander Taits, Allen, TX (US)

(73) Assignee: TEXTRON INNOVATIONS INC., Fort Worth, TX (US)

( * ) Notice: Subject to any disclaimer, the term of this patent is extended or adjusted under 35 U.S.C. 154(b) by 73 days.

(21) Appl. No.: 16/000,439

(22) Filed: Jun. 5, 2018

(65) Prior Publication Data

US 2019/0368954 A1 Dec. 5, 2019

(51) Int. Cl.
| | | |
|---|---|---|
| *G01L 3/00* | (2006.01) | |
| *G01L 3/10* | (2006.01) | |
| *B64C 27/12* | (2006.01) | |
| *B64C 27/00* | (2006.01) | |
| *B64D 45/00* | (2006.01) | |

(52) U.S. Cl.
CPC ............ *G01L 3/105* (2013.01); *B64C 27/006* (2013.01); *B64C 27/12* (2013.01); *B64D 2045/0085* (2013.01)

(58) Field of Classification Search
CPC ....... G01L 3/105; B64C 27/006; B64C 27/12; B64D 2045/0085
USPC .................................................... 73/862.331
See application file for complete search history.

(56) References Cited

U.S. PATENT DOCUMENTS

| | | | | |
|---|---|---|---|---|
| 3,332,282 | A | * | 7/1967 | Daw .......................... G01P 5/00 73/182 |
| 3,591,109 | A | * | 7/1971 | McLarty .................... B64C 1/06 244/17.23 |
| 4,572,053 | A | * | 2/1986 | Sosnowski ............... B64D 1/06 89/1.51 |
| 5,440,938 | A | * | 8/1995 | Leon ....................... G01L 3/101 73/112.01 |
| 5,509,315 | A | | 4/1996 | Brassert et al. |
| 5,766,047 | A | * | 6/1998 | Alexander, Jr. .......... B63H 5/10 416/129 |
| 5,810,276 | A | * | 9/1998 | Fiske ........................ B64D 3/02 242/390.5 |
| 6,782,766 | B2 | * | 8/2004 | Parkinson ............... G01L 3/104 73/862.328 |

(Continued)

*Primary Examiner* — Max H Noori
(74) *Attorney, Agent, or Firm* — Patent Capital Group

(57) ABSTRACT

One embodiment is an apparatus including an inner reference tube associated with a load-bearing rotating shaft and having a first set of teeth associated therewith and disposed around a periphery thereof; an outer reference tube associated with an input gear and disposed about the inner reference, the outer reference tube and having a second set of teeth associated therewith and disposed around a periphery thereof wherein teeth comprising the second set of teeth are interleaved with teeth comprising the first set of teeth to comprise an interleaved set of teeth and wherein the inner reference tube and the outer reference tube rotate about a same longitudinal axis and at a same speed as the rotating shaft; and a sensor system comprising a first variable resistance sensor ("VRS") configured to detect a presence of successive teeth of the interleaved set of teeth and generate an output signal indicative thereof.

17 Claims, 15 Drawing Sheets

(56) References Cited

U.S. PATENT DOCUMENTS

2016/0304192 A1 10/2016 Hale et al.
2016/0376003 A1* 12/2016 Feldman ............... B64C 39/005
  703/2

* cited by examiner

US 10,612,987 B2

SYSTEM FOR MONITORING CHARACTERISTICS OF A LOAD-BEARING ROTATING SHAFT

TECHNICAL FIELD

This disclosure relates in general to the field of aircraft and, more particularly, though not exclusively, to a system for monitoring characteristics of a load-bearing rotating shaft of an aircraft, including torque, speed (in rotations per minute ("RPM")), and azimuth.

BACKGROUND

In aircraft such as rotorcraft, a rotor system including rotor blades generates thrust to propel the aircraft. One or more engines rotate the rotor mast, which, in turn, rotates the rotor blades to generate thrust. A rotorcraft is subjected to various aerodynamic and operational forces during operation, such as lift, drag, centrifugal force, aerodynamic shears, and so forth. It is important to measure and/or determine various operational forces that impact components of a rotorcraft, such as the rotor mast, are subjected to during operation, as well as the effects of such operational forces. Systems and/or devices used to measure and/or determine various operational forces and their effects can implicate numerous performance considerations and can be a challenging aspect of rotorcraft design.

SUMMARY

One embodiment is an apparatus including an inner reference tube associated with a load-bearing rotating shaft and having a first set of teeth associated therewith and disposed around a periphery thereof; an outer reference tube associated with an input gear and disposed about the inner reference, the outer reference tube and having a second set of teeth associated therewith and disposed around a periphery thereof wherein teeth comprising the second set of teeth are interleaved with teeth comprising the first set of teeth to comprise an interleaved set of teeth and wherein the inner reference tube and the outer reference tube rotate about a same longitudinal axis and at a same speed as the rotating shaft; and a sensor system comprising a first variable resistance sensor ("VRS") configured to detect a presence of successive teeth of the interleaved set of teeth and generate an output signal indicative thereof.

The apparatus may further include an input gear for rotating the load-bearing rotating shaft, the inner reference tube, and the outer reference tube. The first VRS may include a plurality of redundant VRSes, which may be disposed around the interleaved set of teeth and are equidistant from one another. The first VRS may include a monopole. In certain embodiments, the first set of teeth includes a gap corresponding to a missing tooth such that the first set of teeth comprises one fewer tooth than the second set of teeth set and wherein the missing tooth corresponds to a zero-degree orientation of the load-bearing rotating shaft such that the output signal generated by the first VRS may be used to determine an azimuth of the load-bearing rotating shaft. The load-bearing rotating shaft may comprise a rotor mast of a rotorcraft.

In some embodiments, the inner reference tube undergoes an identical torsional force as the load-bearing rotating shaft and wherein a portion of the outer reference tube with which the second set of teeth is associated undergoes no torsional force, such that change in a distance between the interleaved teeth as detected by the first VRS and indicated in the output signal correlates to an amount of torque experienced by the load-bearing rotating shaft. Additionally, in certain embodiments, a material from which the inner reference tube is fabricated comprises at least one of a titanium alloy and a composite material and a material from which the outer reference tube is fabricated comprise an aluminum alloy. A frequency of the output signal may correlate to a speed of the load-bearing rotating shaft in rotations per minute ("RPM").

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
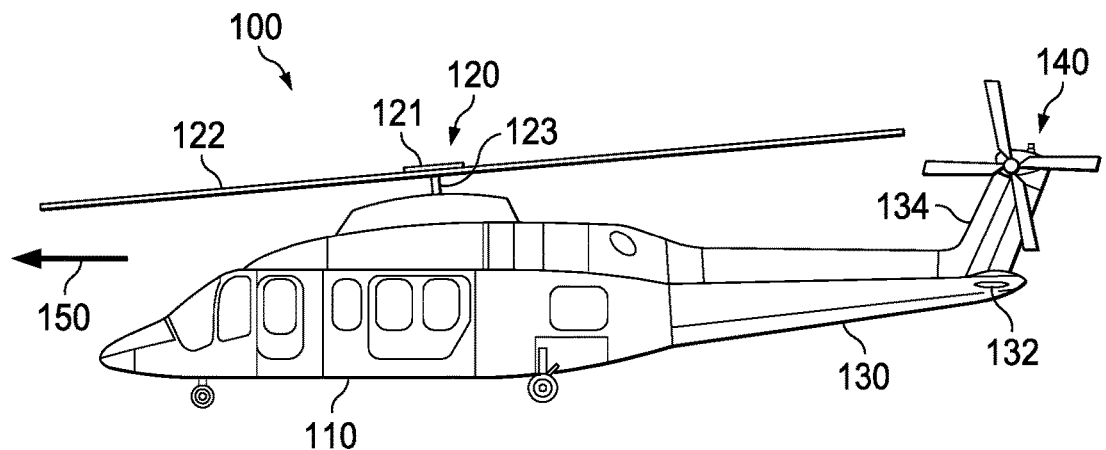
FIGS. 1A-1B and 2 are simplified diagrams of example aircraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions and/or other characteristics (e.g., time, pressure, temperature, distance, etc.) of an element, operations, conditions, etc. the phrase "between X and Y" represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1B:
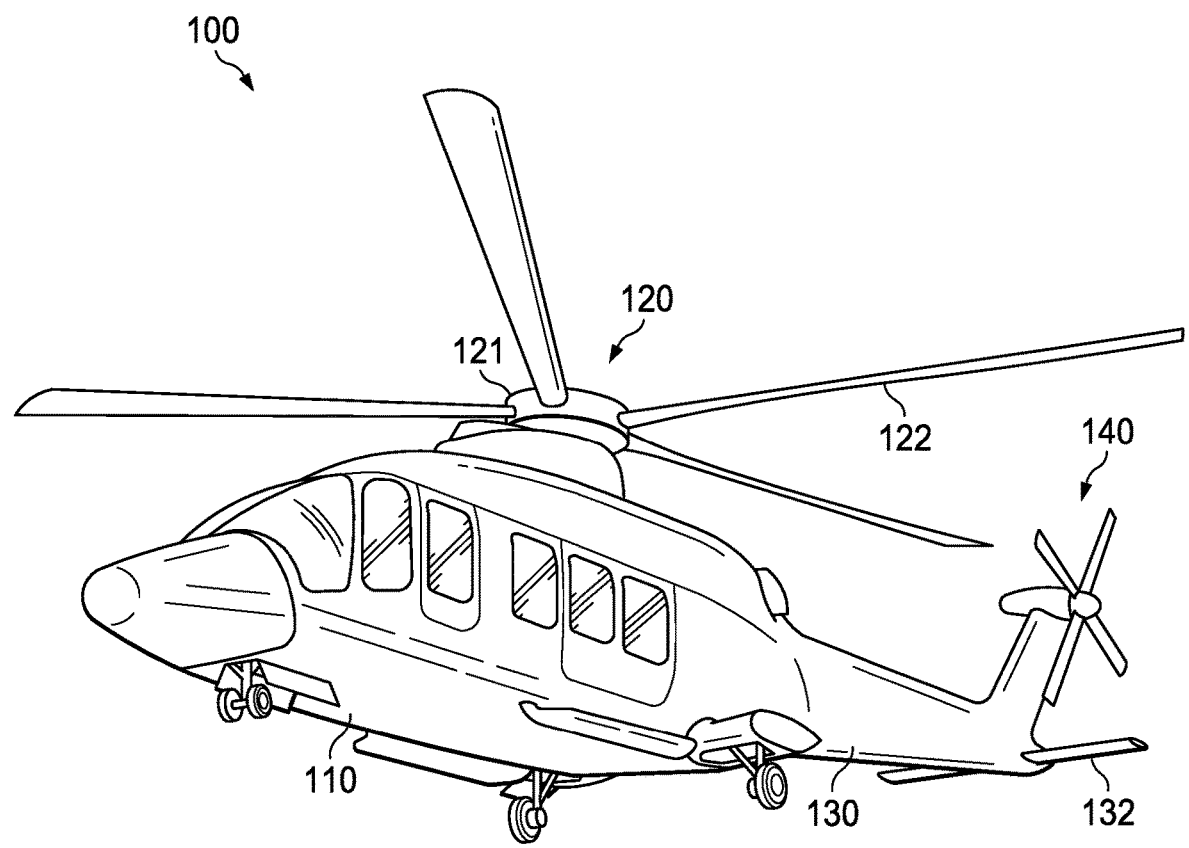

Referring to FIGS. 1A-1B, FIGS. 1A-1B illustrate an example embodiment of an aircraft, which in this example is a rotorcraft 100. FIG. 1A portrays a side view of rotorcraft 100, while FIG. 1B portrays an isometric view of rotorcraft 100. Rotorcraft 100 includes a fuselage 110, a rotor system 120, an empennage 130, and a tail rotor or anti-torque system 140. The fuselage 110 is the main body of the rotorcraft 100, which may include a cabin (e.g., for crew, passengers, and/or cargo) and/or may house certain mechanical components, electrical components, etc. (e.g., engine(s), transmission, flight controls, etc.). The rotor system 120 is used to generate lift for rotorcraft 100. For example, the rotor system 120 (also generally referred to as the "rotor") may include a rotor hub 121 (also referred to as a "rotor hub assembly" or more generally as a "hub") coupled to a plurality of rotor blades 122 (also referred to generally as "blades"). Torque generated by the engine(s) of the rotorcraft causes the rotor blades 122 to rotate, which generates lift. The rotor system 120 is supported by a mast 123 (FIG. 1A). The empennage 130 of the rotorcraft 100 includes a horizontal stabilizer 132, vertical stabilizer 134, and tail rotor or anti-torque system 140. The horizontal stabilizer 132 and vertical stabilizer 134 respectively provide horizontal and vertical stability for the rotorcraft 100. Moreover, tail rotor or anti-torque system 140 may be used to provide anti-torque and/or direction control for the rotorcraft 100.

Figure 2:
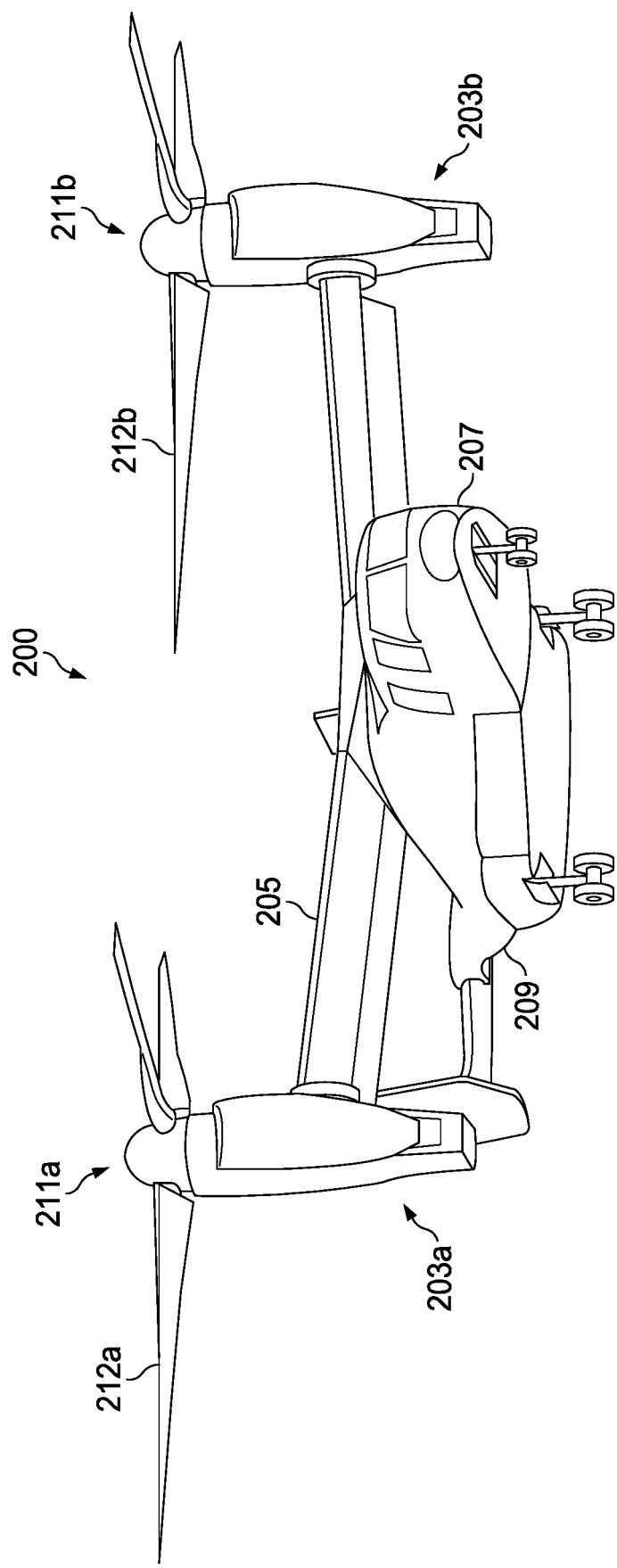

Referring to FIG. 2, FIG. 2 illustrates a perspective view of an example aircraft, which in this example is a tiltrotor aircraft 200. Tiltrotor aircraft 200 includes nacelles 203a and 203b, a wing 205, a fuselage 207, and a tail member 209. Nacelles 203a and 203b respectively include rotor systems 211a and 211b, and each rotor system includes a plurality of rotor blades 212a and 212b, respectively. Moreover, each nacelle 203a and 203b may include engine(s) and gearbox(es) for driving each rotor system 211a and 211b, respectively. In some embodiments, nacelles 203a and 203b may each be configured to rotate between a helicopter mode, in which the nacelles 203a and 203b are approximately vertical (as shown in FIG. 2), and an airplane mode, in which the nacelles 203a and 203b are approximately horizontal. In the illustrated embodiment, the tail member 209 may be used as a vertical stabilizer.

Aircraft such as rotorcraft 100 and tiltrotor aircraft 200 rely on rotor systems (e.g., rotor system 120 and tail rotor or anti-torque system 140 of rotorcraft 100) for flight capabilities, such as controlling (e.g., managing and/or adjusting) flight direction, thrust, and lift of the aircraft. Consider various examples involving rotorcraft 100, which can also be applicable to tiltrotor aircraft 200 in various embodiments. For rotorcraft 100, the pitch of each rotor blade 122 can be controlled using collective control or cyclic control to selectively control direction, thrust, and lift of the rotorcraft 100.

During collective control, all the of rotor blades 122 are collectively pitched together (e.g., the pitch angle is the same for all blades), which effects overall thrust and lift. During cyclic control, the pitch angle of each of the rotor blades 122 varies depending on where each blade is within a cycle of rotation (e.g., at some points in the rotation the pitch angle is not the same for all blades), which can affect direction of travel of the rotorcraft 100.

Aircraft such as rotorcraft 100 of FIGS. 1A-1B and tiltrotor aircraft 200 of FIG. 2 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms "hub/blades", "yoke/blades", "hub/yoke/blades", and variations thereof) to flapping, leading and lagging, and/or bending. For example, flapping is a result of the dissymmetry of lift produced by rotor blades at different positions (typically referred to as "pitch" or "pitch angles") during a single rotation. During rotation, for example, a rotor blade may generate more lift while advancing in the direction of travel of the rotorcraft than while retreating in the opposite direction. A rotor blade may be flapped up (also sometimes referred to as being pitched "nose-up") while advancing in the direction of travel, and may flap down (e.g., pitched "nose-down") while retreating in the opposite direction. When a blade is pitched more nose-up, more lift is created on that blade, which will drag the side of the rotor/hub upward, which makes the hub/yoke flap. For example, for rotorcraft 100 of the embodiment of FIG. 1A, the most aft blade (e.g., nearest to tail rotor or anti-torque system 140) of the rotor system 120 may be pitched more nose-up and the most forward blade may be pitched more nose-down; to provide a forward direction of travel (as generally indicated by arrow 150) for rotorcraft 100.

Further, a rotor blade may be subjected to a leading force that causes the blade to lead forward while advancing in the direction of travel, and a lagging force that causes the blade to lag backwards while retreating. Moreover, forces exerted on rotor blades may also subject them to bending. For example, the loads resulting from flapping and lead/lag forces may cause rotor blades to bend. In some cases, for example, lift and centrifugal force acting together (e.g., as upward and outward forces) may cause rotor blades to bend upwards or "cone".

It is important to measure the forces experienced by the rotor masts, as well as the resulting impact of those forces, during aircraft operation. Systems and/or devices used to measure and/or determine various operational forces and the results thereof can implicate numerous performance considerations and can be a challenging aspect of rotorcraft design. With regard to rotor masts, torque, speed (measured in RPM), azimuth, and/or torsional anomalies may be monitored for use in determining proper operation of the equipment and extending the useable life thereof. Such monitoring may also be performed to maintain a collinear relationship between the rotor shaft and equipment to which it is coupled and to ensure that the torque transmitted along the rotor shaft remains within predefined limits. Azimuth variations may indicate that shaft realignment may be necessary.

The problem with certain existing toque measurement systems for use in connection with tiltrotor masts is that they are often based on strain-gauge technology, which is highly susceptible to temperature variations. Other systems utilize magnetic means for measuring torque, but require numerous sensors to perform the torque measurement in addition to sensors disposed for other purposes, thereby greatly increasing the complexity of the system.

In accordance with features of embodiments described herein, three redundant variable reluctance sensors ("VR sensors," "VRSes" or "monopoles") are positioned about an interleaved array of teeth connected to two reference tubes. A first one of the reference tubes is associated with the rotor mast and a second one of the reference tubes is associated with an input gear shaft. Each monopole measures three values, including RPM, azimuth, and torque. As will be described in greater detail hereinbelow, RPM is obtained by tracking the teeth on the input gear shaft reference tube. A missing tooth on tiltrotor mast reference tube enables the determination of azimuth. The phase difference between the interleaved teeth correlate to torque.

Embodiments described throughout this disclosure may provide numerous technical advantages including, but not limited to the ability to measure torque, RPM, and azimuth in connection with a rotor mast at a single point using information from a single sensor, rather than having to combine information from multiple sensors disposed at different locations along the mast. The measurements obtained by the sensor may be input to a control system and used to detect other conditions, such as torsional anomalies and mast misalignment.

Example embodiments associated with a system for monitoring characteristics of a load-bearing rotating shaft are described below with more particular reference to the remaining FIGURES. It should be appreciated that the rotorcraft 100 of FIGS. 1A-1B and tiltrotor aircraft 200 of FIG. 2 are merely illustrative of a variety of aircraft that can be used to implement embodiments of the present disclosure described and illustrated herein. Other aircraft implementations can include, for example, fixed wing airplanes, hybrid aircraft, unmanned aircraft, gyrocopters, a variety of helicopter configurations, and drones, among other examples. The FIGURES and the corresponding descriptions are applicable to any type of aircraft. Moreover, it should be appreciated that even though aircraft are particularly well suited to implement embodiments of the present disclosure, the described embodiments can also be implemented using non-aircraft vehicles and devices.

Figure 3:
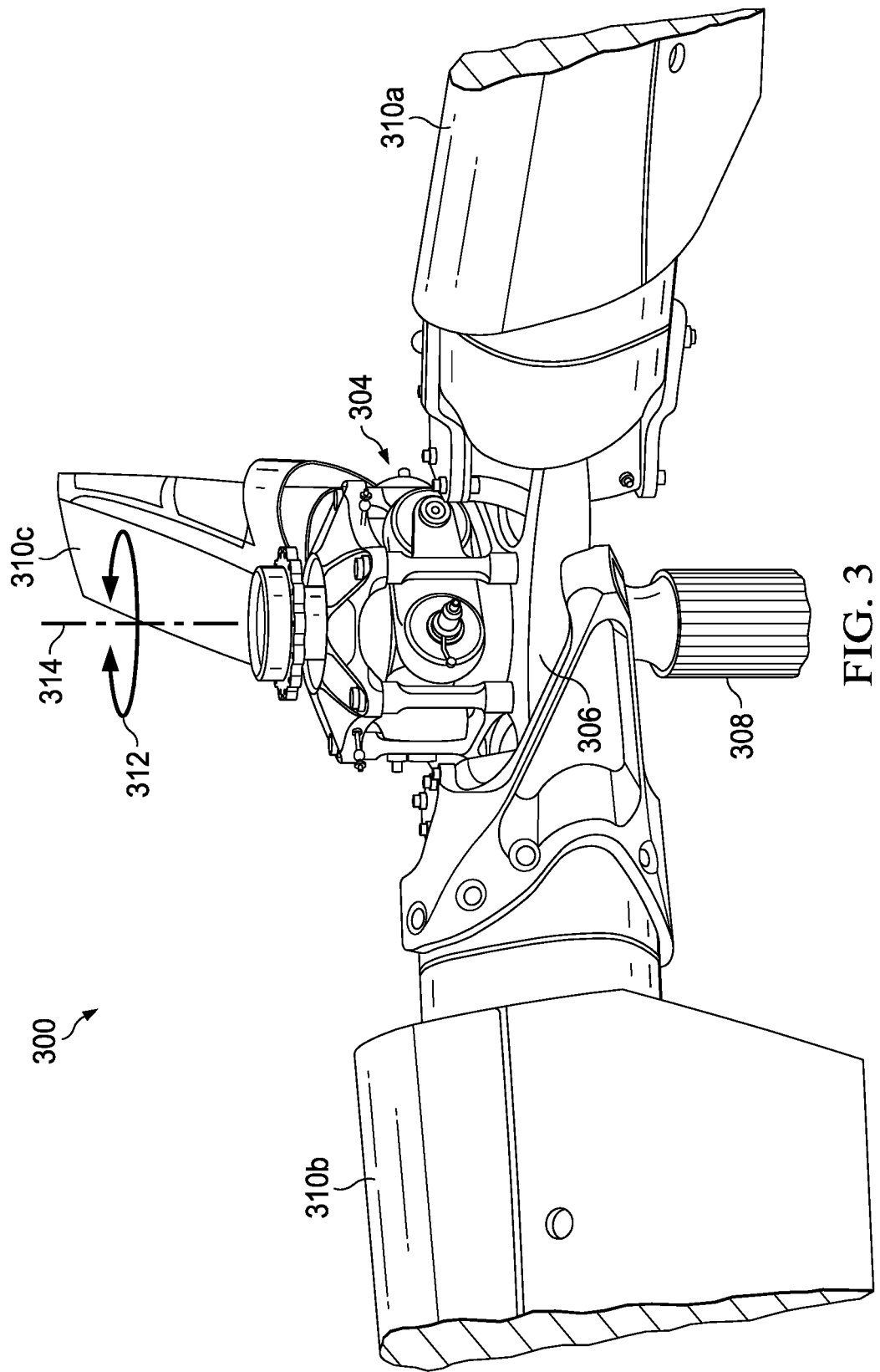
FIG. 3 is a simplified schematic of a portion of an example rotor system for use in one of the example aircraft shown in FIGS. 1A-1B and 2 in accordance with certain embodiments.

FIG. 3 is a simplified schematic diagram illustrating example details associated with a system for monitoring characteristics of a load-bearing rotating shaft, which in some embodiments may be implemented as a rotor mast. In particular, FIG. 3 is a simplified isometric view diagram illustrating example details associated with a rotor system 300 in connection with which a system for monitoring characteristics of a load-bearing rotating shaft (including a rotor mast) embodying features of the present disclosure may be advantageously implemented as described herein. As shown in FIG. 3, the rotor system 300 includes a rotor hub 304 and a yoke 306. The rotor hub 304 and yoke 306 are supported by a mast 308. A number of rotor blades 310, including a first rotor blade 310a, a second rotor blade 310b, and a third rotor blade 310c, may be attached to the yoke 306. In various embodiments, rotor system 300 may be representative of rotor system 102 as discussed for rotorcraft 100 illustrated in FIGS. 1A-1B and/or rotor systems 211a, 211b as discussed for tiltrotor aircraft 200 illustrated in FIG. 2.

The mast 308 may be configured to transfer a rotational force and/or torque (generally indicated by arrow 312, which may be clockwise or counterclockwise) to the rotor system 300 (e.g., to the yoke 306) about a rotational axis 314 (collinear with the center of the mast 308), thereby causing the rotor blades 310 to rotate about the rotational axis. The rotational force and/or torque 312 may be supplied by engine(s) during operation.

Figure 4A:
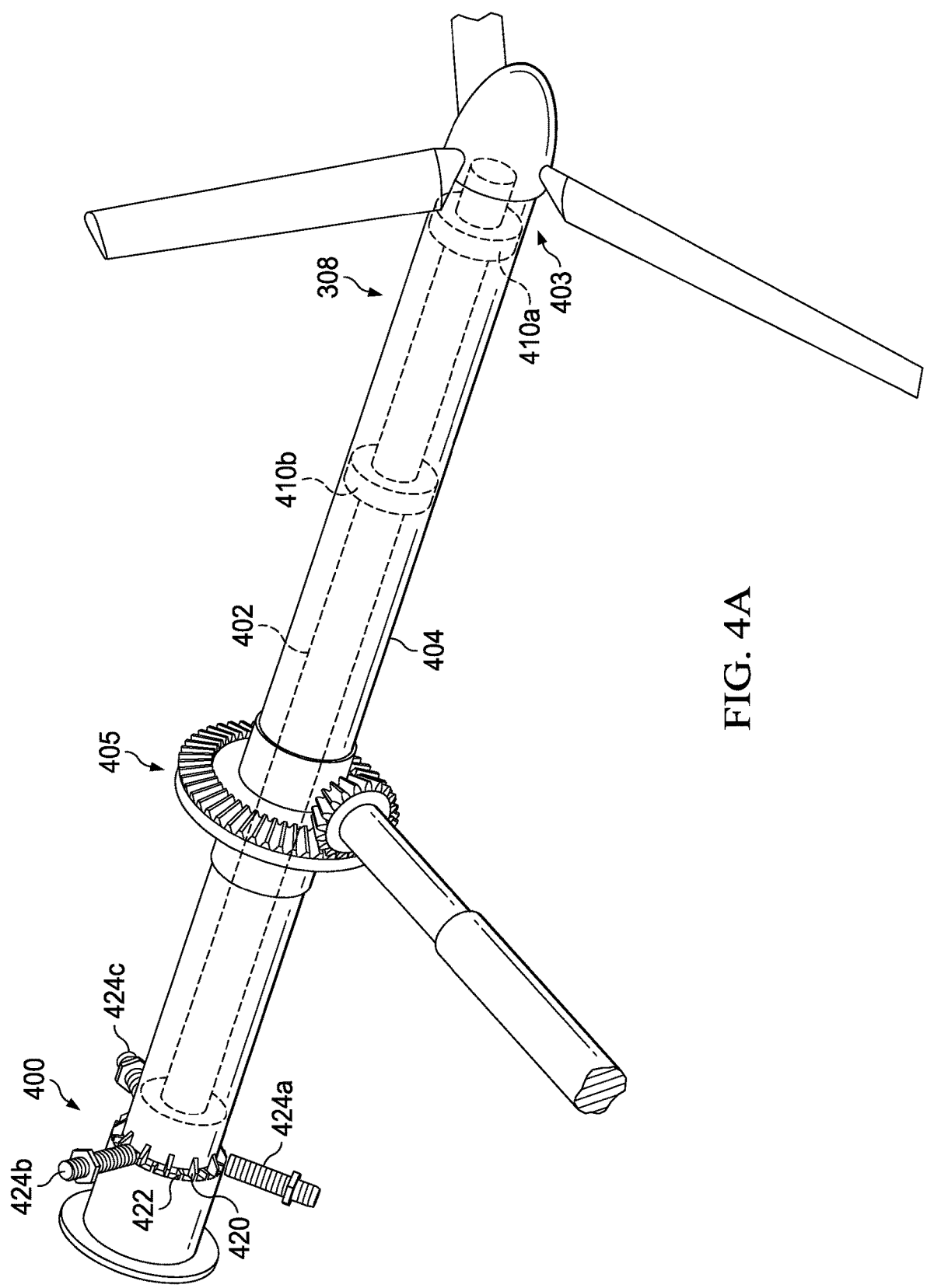
FIGS. 4A-4B are simplified schematic diagrams illustrating example details associated with a system for monitoring various characteristics of a load-bearing rotating shaft in accordance with embodiments described herein.
Figure 4B:
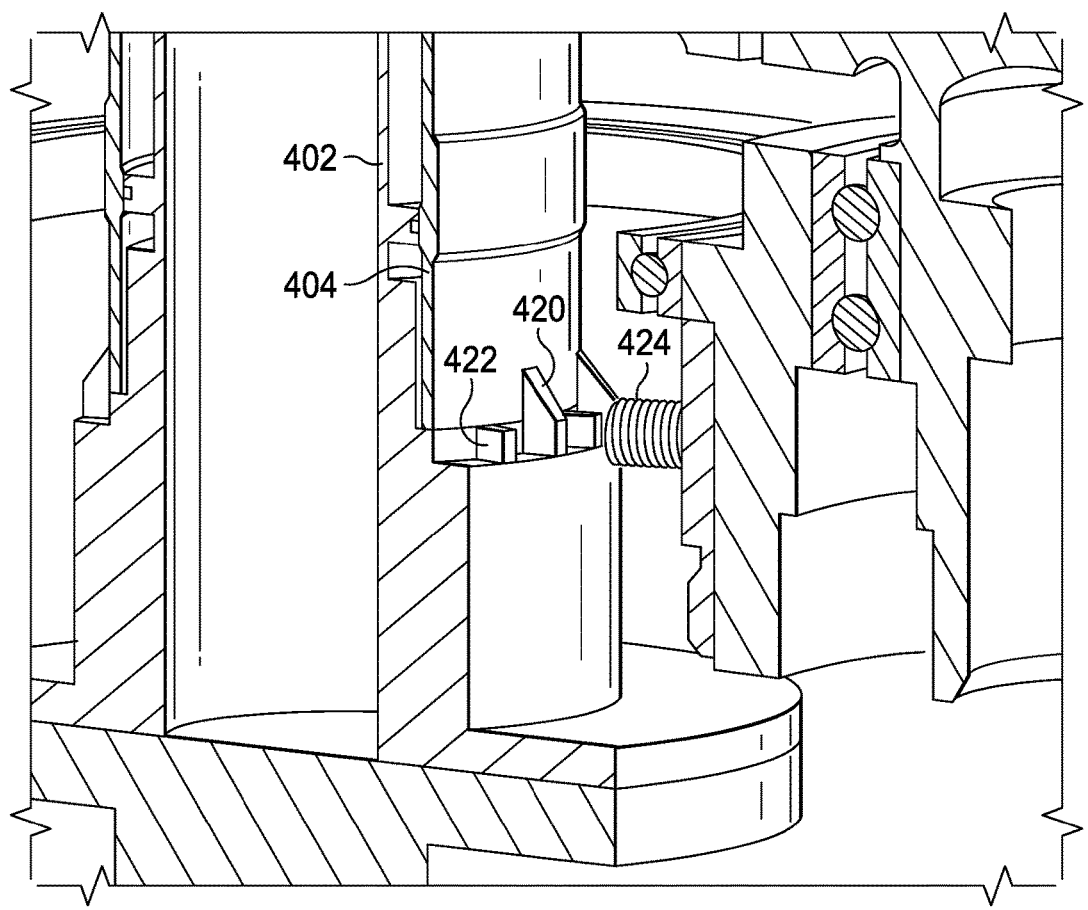

FIGS. 4A and 4B are simplified schematic diagram illustrating additional example details associated with a system for monitoring characteristics of a load-bearing rotating shaft, such as the rotor mast 308. The rotor system 300 disposed at the top of the mast 308, as shown in FIG. 3, is not shown in FIG. 4A for purposes of simplicity. As shown in FIG. 4A, a system for monitoring characteristics of the rotor mast 308 comprises a sensor system 400. In accordance with features of embodiments described herein, the rotor mast 308 includes a first reference tube, which may also be referred to herein as a "mast reference tube" or an "inner reference tube," 402, and a second reference tube, which may also be referred to herein as a "input gear reference tube" or an "outer reference tube," 404.

The inner reference tube 402 is fabricated from a very stiff material (such as titanium alloy or a composite material, for example) to transfer the torsion from a point 403 at which the mast 308 attaches to rotor hub 304 to the location of the sensor system 400. The outer reference tube 404 includes an upper section 404a, which extends from an input pinion gear 405 to the point 403 at which the mast 308 attaches to the rotor hub 304, and a lower section 404b, which extends from the input pinion gear 405 to the location of the sensor system 400. The entire outer reference tube 404 is fabricated from a less-stiff material (such as an aluminum alloy, for example) such that the upper section 404a undergoes sufficient torsion under load. The Lower section 404b will not undergo such torsion under load, since the load is canceled out by the input pinion gear 405; as a result, lower portion may be used as the reference. In other words, the inner reference tube 402 and upper section 404a have the same RPM and phase, while the inner reference tube 402 and the lower section 404b have the same RMP, but a different phase, as the lower section 404b undergoes no torsion. At the point 403, both the inner reference tube 402 and outer reference tube 404 are connected together, such that the torque is transferred to both tubes when the hub 304 is under load. A number of bearings, represented in FIG. 4A by bearings 410a, 410b, are disposed throughout the illustrated assembly to ensure that the tubes 402, 404, remain in line with one another. In certain embodiments, the torque range is approximately 40,000 ft-lbs.

FIG. 4B is a magnified cutaway view of a portion of FIG. 4A showing additional details of the sensor system 400. As shown in FIG. 4B, an end of input gear reference tube 404 distal from the rotor system 300 has disposed around an external perimeter thereof a plurality of teeth 420. Similarly, an end of the mast reference tube 402 distal from the rotor system 300 has disposed around an external perimeter thereof a plurality of teeth 422. As will be illustrated in greater detail in the figures referenced below, the teeth 420 are interleaved with the teeth 422. The sensor system 400 further includes a plurality of redundant sensors 424, only one of which is visible in the view illustrated in FIG. 4B. In some embodiments, the sensors 424 are implemented as Variable Reluctance Sensors, or monopoles.

Figure 5:
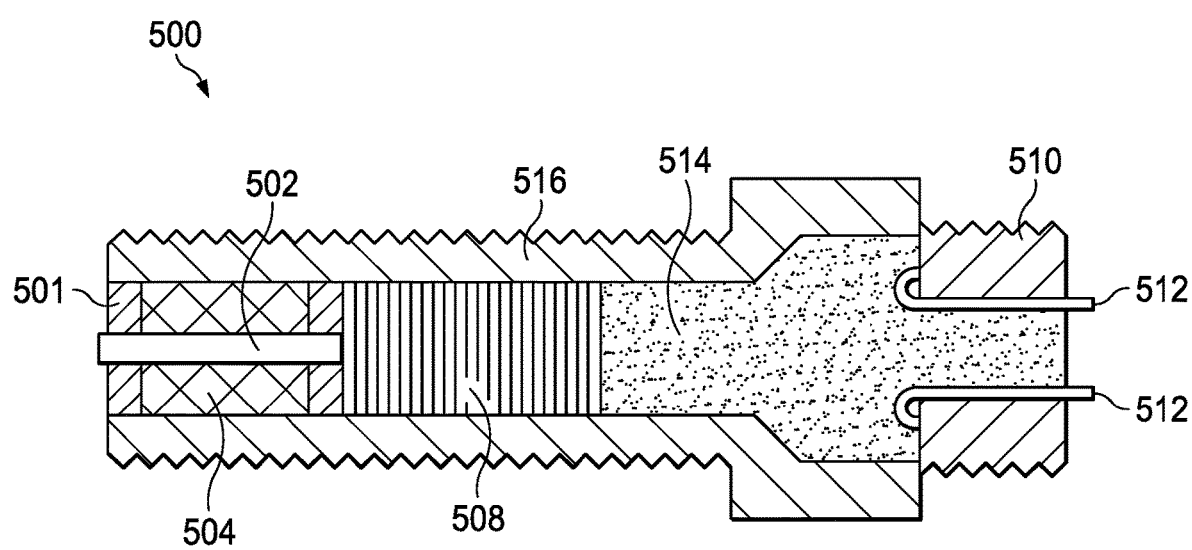
FIG. 5 is a simplified schematic diagram of an example sensor for use in a system for monitoring various characteristics of a load-bearing rotating shaft in accordance with embodiments described herein.

FIG. 5 is a simplified schematic view of an example monopole 500 that may be used to implement the sensors 424 described herein. As shown in FIG. 5, the monopole 500 includes a pole end 501 including a ferromagnetic pole piece 502 disposed within a coil portion 504 and connected to a magnet 508. A connector end 510 includes connector pins 512 disposed within potting material 514. All of the aforementioned elements of the monopole 500 are housed within a shell 516. In a particular embodiment, the shell 516 may have a length of approximately 2.9 inches. A diameter of the pole piece 502 may be approximately 0.93 inches and a diameter of the connector end 510 may be approximately 0.664 inches. It will be recognized that the specifics regarding the monopole 500 are for purposes of illustration only and that a variety of different types of sensors may be used to implement the sensors 424.

As previously noted, in accordance with features of embodiments described herein, the sensors 424 may be implemented using VR sensors, which may be used to detect the change in proximity or presence of ferrous objects (e.g., ferrous teeth on a gear). The normal output of a VR sensor is an analog signal, shaped much like a sinewave. The frequency and amplitude of the output signal is proportional to the velocity of the target. A VR sensor may include integrated interface circuitry for rendering the signal digitally readable. In accordance with embodiments described herein, VR sensors are used to detect the angular position and velocity of a rotating toothed wheel. In particular, as the teeth (or other target features) of the rotating wheel pass by the face of the pole piece, the amount of magnetic flux passing through the magnet, and consequently the coil, varies. When the gear tooth is close to the sensor, the flux is at a maximum; when the tooth is further away, the flux decreases. The moving target comprising the rotating toothed wheel results in a time-varying flux that induces a proportional voltage in the coil. The signal may subsequently be processed as needed to produce a digital waveform that may be used for a variety of purposes. Advantages of VR sensors include that they are low cost and useful for detecting fairly high-speed motion. They are also operable in high-temperature environments and environments in which the sensors are submerged in liquid, such as machine oil. In certain embodiments described herein, the sensor system is disposed where the slip ring is and thus submerged in some type of oi. Additional devices such as filters may be provided as needed to prevent material debris disposed in the oil from floating inside the pole gap and affecting the measurements. Monopoles are also very useful from a maintenance perspective, as they may be implemented like spark plugs and simply wrenched in and out from the outside of the system.

Figure 6A:
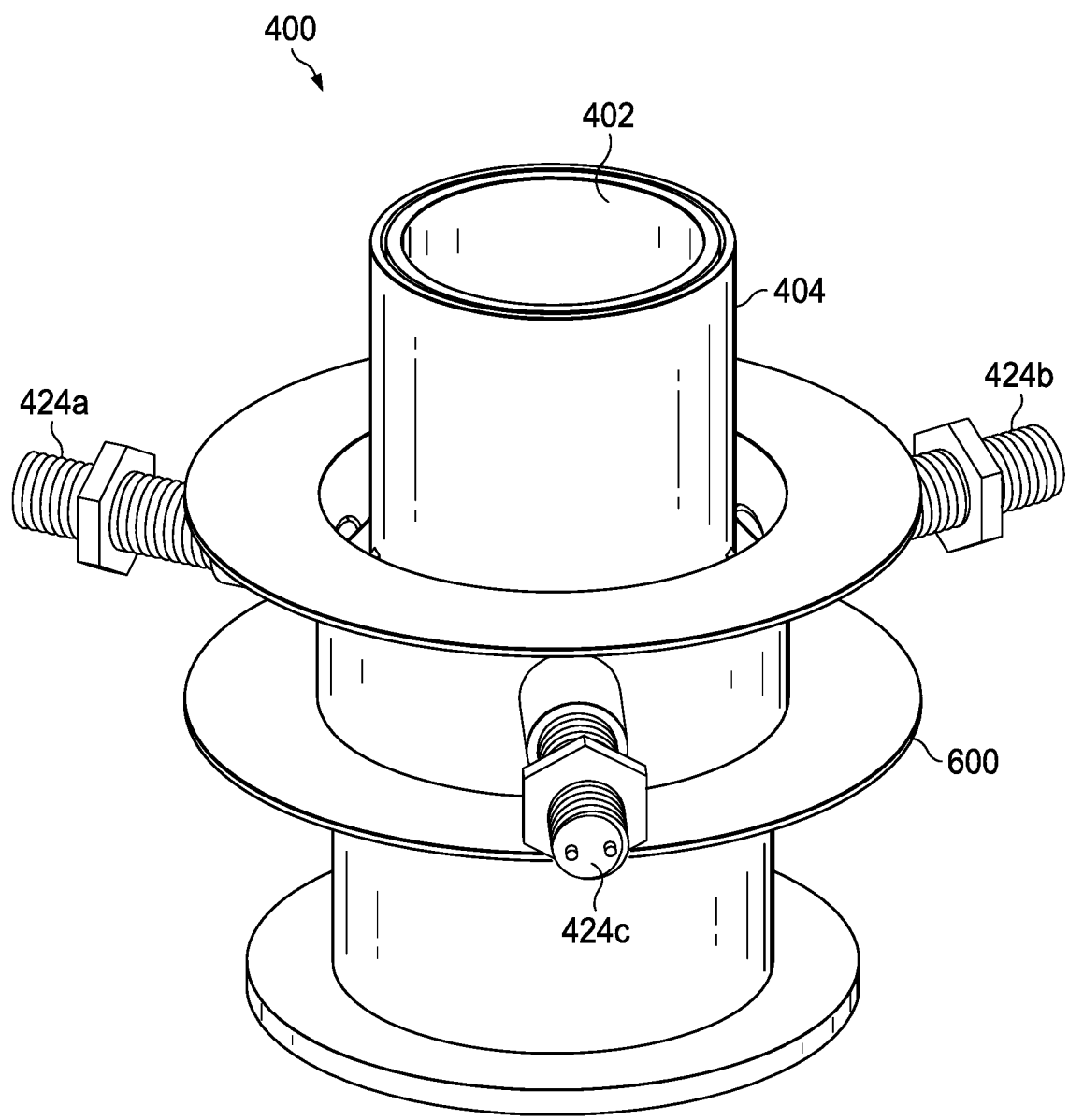
FIG. 6A is a simplified side view illustrating example details associated with a system for monitoring various characteristics of a load-bearing rotating shaft in accordance with certain embodiments.
Figure 6B:
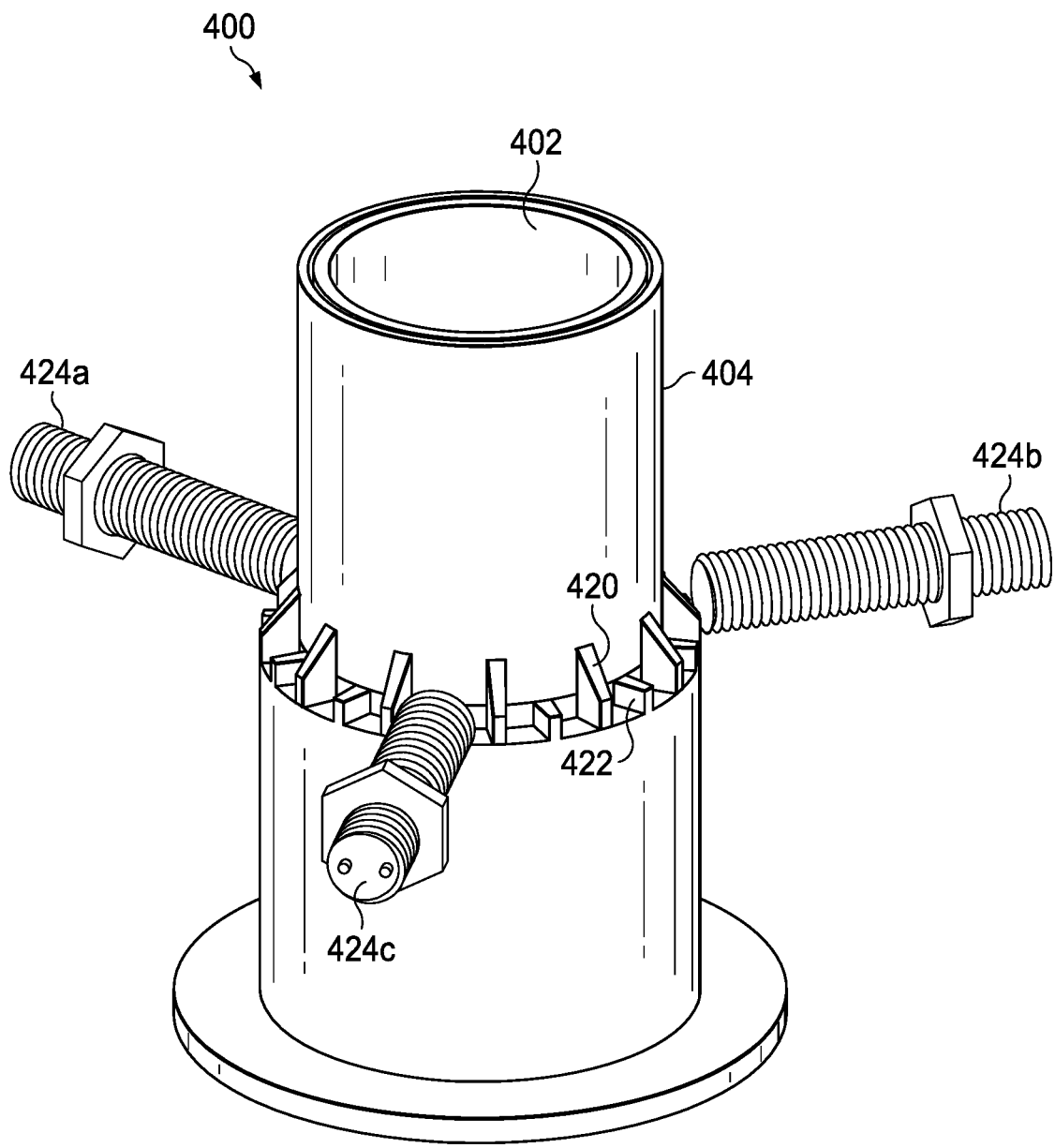
FIG. 6B is another simplified side view of the system for monitoring various characteristics of a load-bearing rotating shaft as shown in FIG. 6A in which a sensor manifold has been removed for purposes of illustration.
Figure 6C:
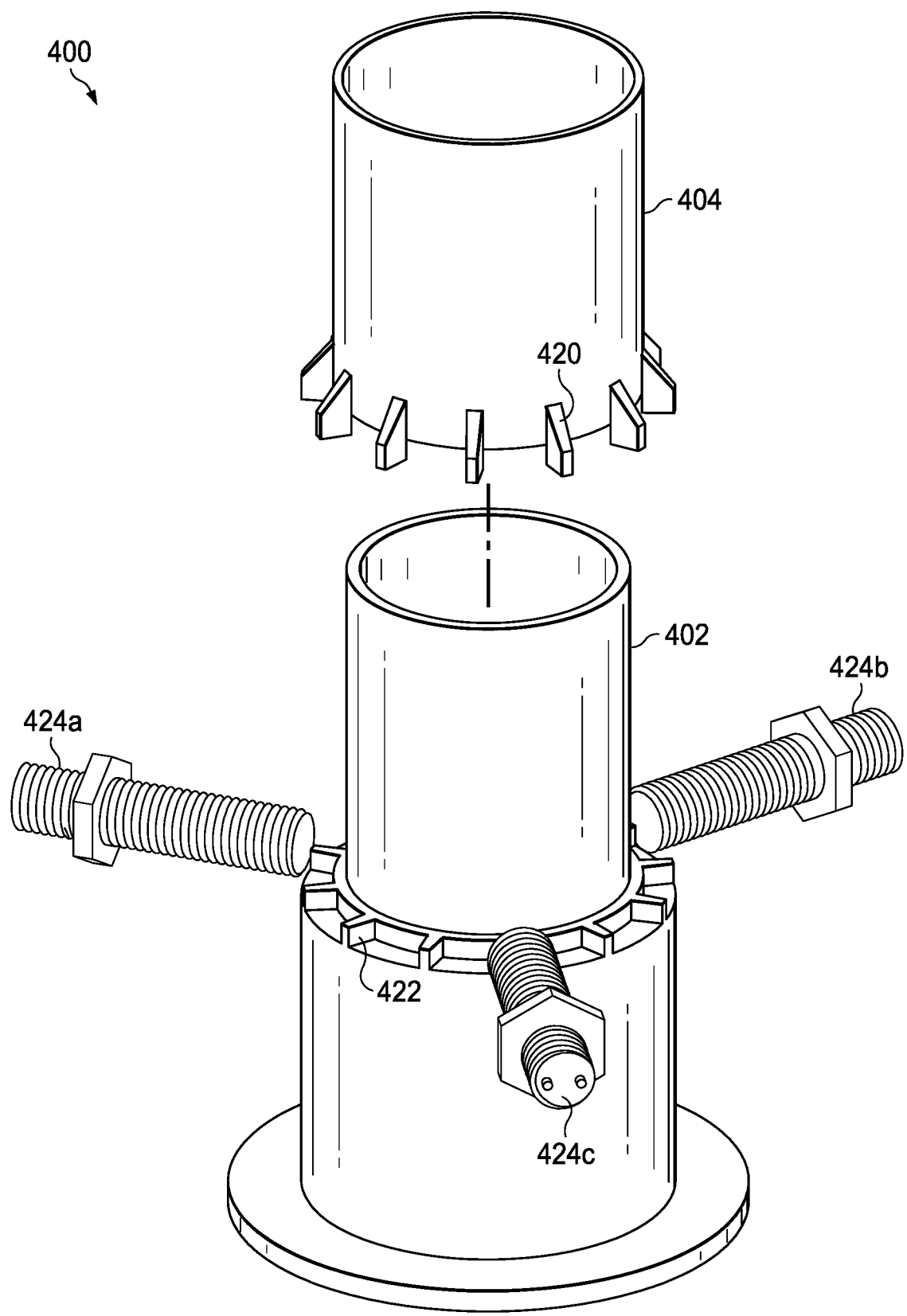
FIG. 6C is an exploded view of the system for monitoring various characteristics of a load-bearing rotating shaft as shown in FIG. 6B.

FIGS. 6A-6D illustrate various schematic views of the sensor system 400 showing additional example details that may be associated therewith. In particular, FIG. 6A is a perspective view from a side of the sensor system 400 showing a manifold 600 for holding the sensors 424a, 424b, and 424c, in place relative to the teeth (not clearly shown in FIG. 6A). It will be noted that in the illustrated embodiment, the sensors 424 are disposed equidistant from each other around the outer perimeter of the tubes 402, 404, and are positioned such that they detect the teeth as they pass, as will be described in greater detail below. In alternative embodiments, the sensors need not positioned equidistant from one another and a different number of redundant sensors may be used. FIG. 6B is a perspective view from a side of the sensor system 400 with the manifold 600 removed so that the teeth 420, 422, are more clearly visible. FIG. 6C is a partially exploded perspective side view of the sensor system 400, which is intended to illustrate how the tube 402 extends within the tube 404.

Figure 6D:
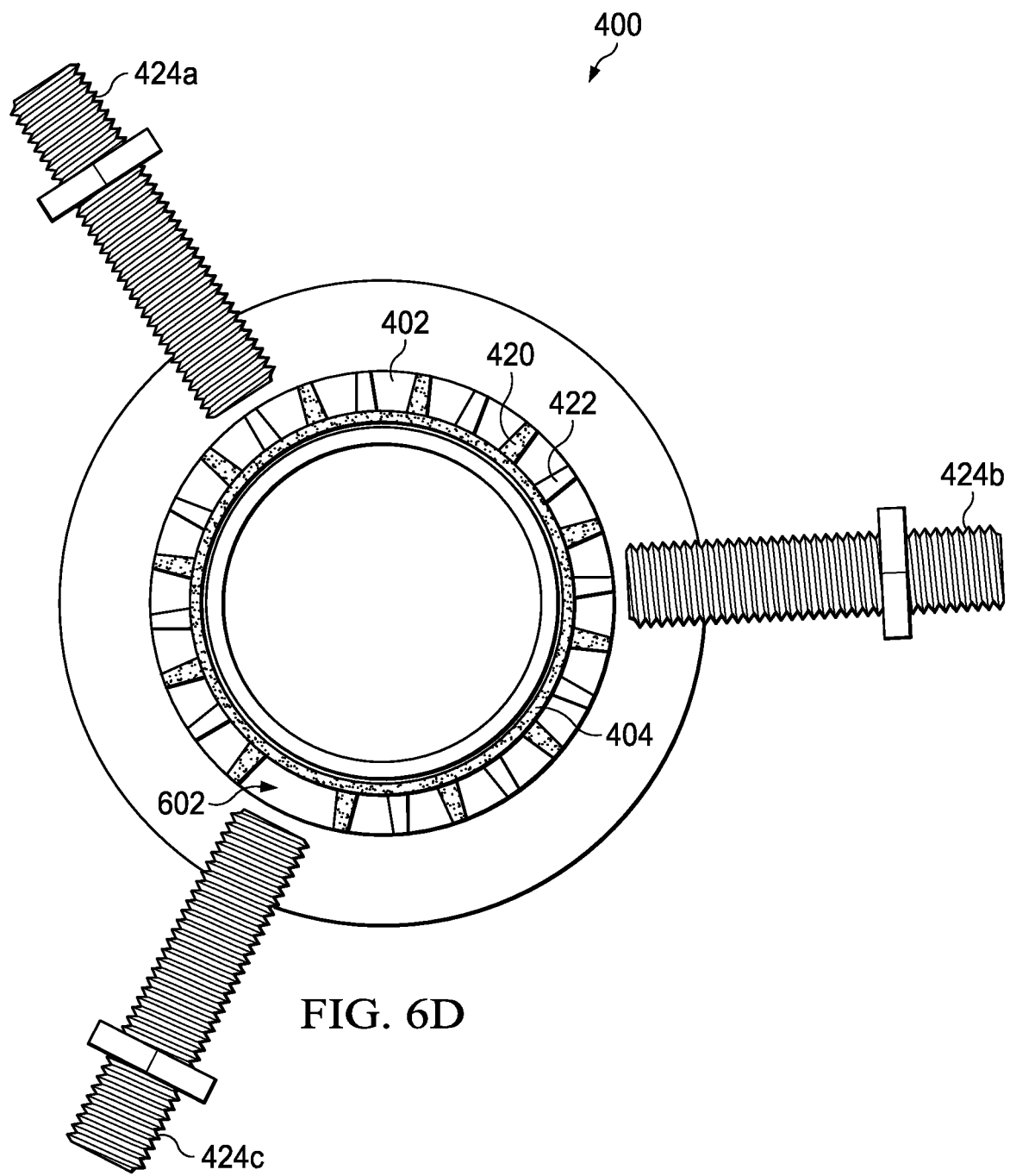
FIG. 6D is a top cutaway view of the system for monitoring various characteristics of a load-bearing rotating shaft as shown in FIG. 6B.

FIG. 6D is a perspective cutaway view from just above the sensor system 400 more clearly illustrating how the sets of teeth 420, 422, are interleaved with one another. As clearly illustrated in FIG. 6D, the teeth 420 are equally spaced around the tube 404. In the illustrated embodiment, a diameter of the tube 404 at a location at which the teeth 420 are disposed is approximately 3 inches and there are 12 teeth 420 disposed around the tube. Similarly, in the illustrated embodiment, the diameter of the tube 402 at a location at which the teeth 422 are disposed thereon is approximately 3 inches; however, instead of 12 there are only 11 teeth positioned as if there were 12 teeth equally spaced around the tube, with a space 602 corresponding to the "missing" tooth. In accordance with features of embodiments described herein, the "missing" tooth 602 corresponds to one of the rotor blades 310 designated the "zero-degree blade," for purposes that will be described in greater detail below.

Figure 7:
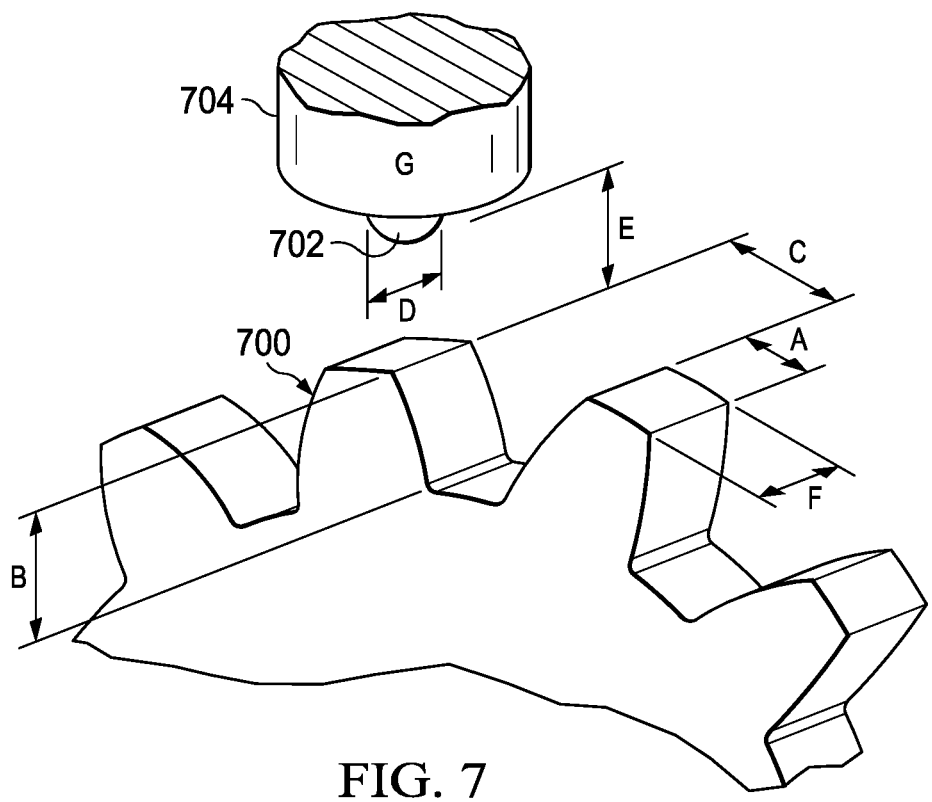
FIG. 7 is a simplified illustration of optimum dimensions of gear teeth as related to a diameter of a pole piece of a sensor, such as the sensor shown in FIG. 5, in accordance with certain embodiments.

FIG. 7 illustrates optimum dimensions of gear teeth 700 as related to a diameter of a pole piece 702 of a standard VR sensor, or monopole, 704 in accordance with a particular example embodiment, for maximizing the signal output from the sensor 704. For example, assuming a diameter of the pole piece 702 is D, a width A of the top of each tooth 700 is optimally greater than or equal to D. A height B of each tooth 700 is optimally greater than or equal to a distance C between two consecutive teeth, which in turn is optimally greater than or equal to three times D. A clearance E between a tip of the pole piece 702 and the top of each tooth 700 should optimally be as small as possible for the application. A thickness F of each tooth 700 is optimally greater than or equal to D.

In a particular implementation of a system for monitoring various characteristics of a load-bearing rotating shaft in accordance with certain embodiments described herein, the diameter of the assembled (i.e., one inside the other) reference tubes 402, 404, is approximately 3 inches and the width (A) and thickness (F) of each of the teeth 420, 422, is approximately 0.1 inches and the height (B) of each of the teeth is approximately 0.3 inches. Given that there is a total of 24 interleaved teeth 420, 422, which includes the missing one of teeth 422 that would otherwise be disposed in the gap 602 (FIG. 6D), disposed around the periphery of the assembled tubes 402, 404, a distance C between consecutive interleaved teeth (i.e., between one of the teeth 420 and a consecutive one of the teeth 422) is approximately 0.2925 inches. This translates into a distance between consecutive teeth on a single one of the reference tubes 402, 404 (i.e., non-interleaved teeth) ("H") of approximately 0.685 inches. For the mast reference tube 402, the gap 602 comprising the missing tooth is approximately 1.334 inches.

In various embodiments, each of the sensors 424 in the sensor system 400 may form a part of in an aircraft control system of an aircraft in which the sensors may be electrically connected to flight control system(s), computing device(s), processor(s), combinations thereof, or the like in order to communicate electrical signals and/or information between the sensors 424 and the system(s), processor(s), etc. In various embodiments, the electrical signals and/or information can include signals that translate to torque, RPM, and azimuth of the rotor mast. It is to be understood that signals provided by sensors 424 may be used to determine a torque, RPM, and azimuth in connection with the rotor mast 308 using any combination of mathematical algorithms, models, software, hardware, etc. as would be would be appreciated by one of ordinary skill in the art.

Figure 8A:
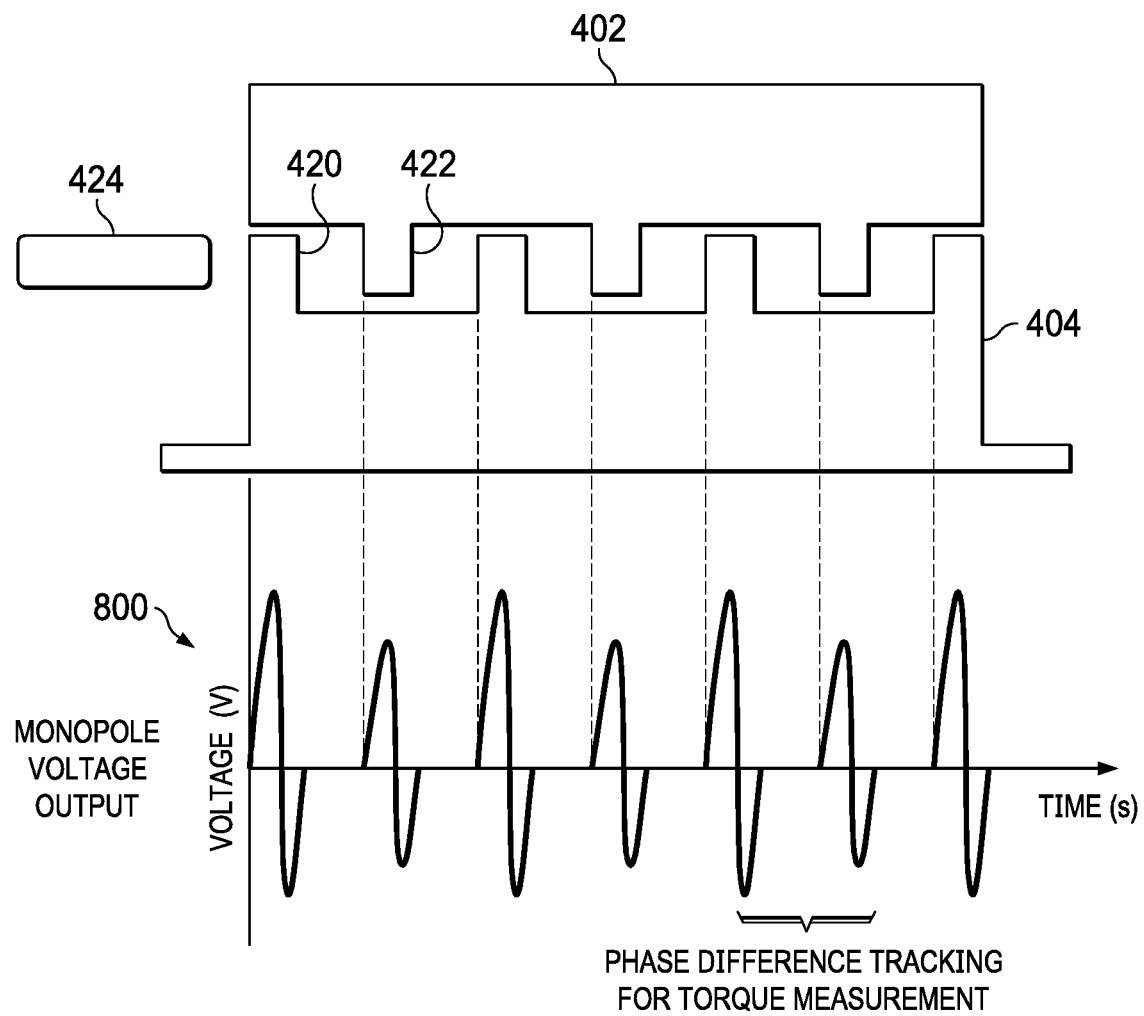
FIG. 8A illustrates an example sensor output signal in a system for monitoring various characteristics of a load-bearing rotating shaft in accordance with certain embodiments.

FIG. 8A illustrates an example sensor output signal in a system for monitoring various characteristics of a load-bearing rotating shaft in accordance with certain embodiments. As illustrated in FIG. 8, a phase difference between consecutive interleaved teeth correlates to torque experienced by the rotor mast, as represented by the mast reference tube 402, relative to the input gear reference tube 404, which undergoes no torque. In particular, as the rotor mast, and hence the tube 402, torques, the teeth 422 shift relative to the teeth 420 of the input gear reference tube 404, thus changing a phase of a signal 800 output from the sensor 424; the phase change correlates to the torque experienced by the rotor mast. RPM of the rotor mast may be determined by tracking the frequency of the interleaved teeth 420, 422, as they pass in front of the sensor. The one of the teeth 422 on the mast reference tube 402 enables detection of rotor azimuth (i.e., location of the blade 310 designated the zero-degree blade). In other words, a missing peak in the output signal 800 correlates to a rotor system position of zero degrees. The information gleaned from the output signal 800 may also be used to detect torsional anomalies and mast misalignment.

For example, to determine torsional anamolies, torque, RMP, and azimuth data may be collected and saved (e.g., in a database) during a typical flight. Maintenance crews may subsequently (e.g., post-flight) access the data and pass the time-varying torque-data to frequency domain, possibly using a Fourier Transform. The transformed data may then be analyzed to reveal the frequency with which the mast undergoes torsion, which remains relatively unchanged throughout the aircraft cycle, until anamolies are detected, which would indicate that the mast requires some maintenance.

Figure 8B:
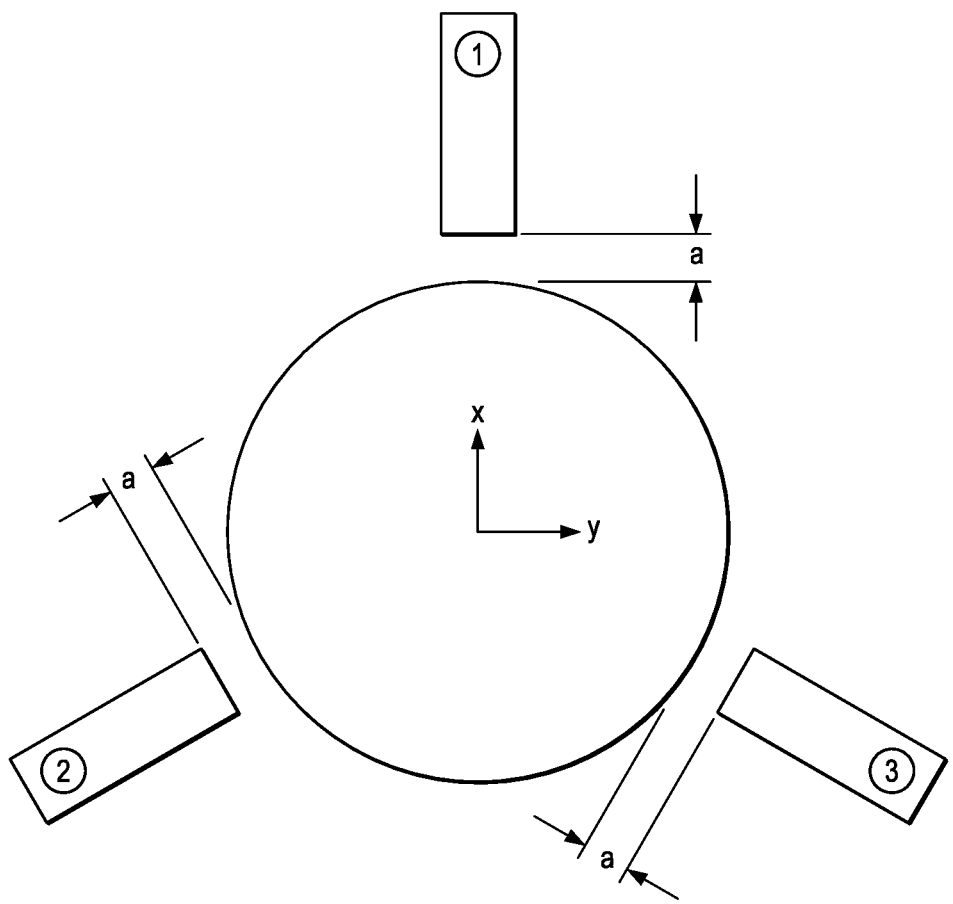
FIG. 8B illustrates an example of nominal shaft alignment as detected by a system for monitoring various characteristics of a load-bearing rotating shaft in accordance with certain embodiments.
Figure 8B:
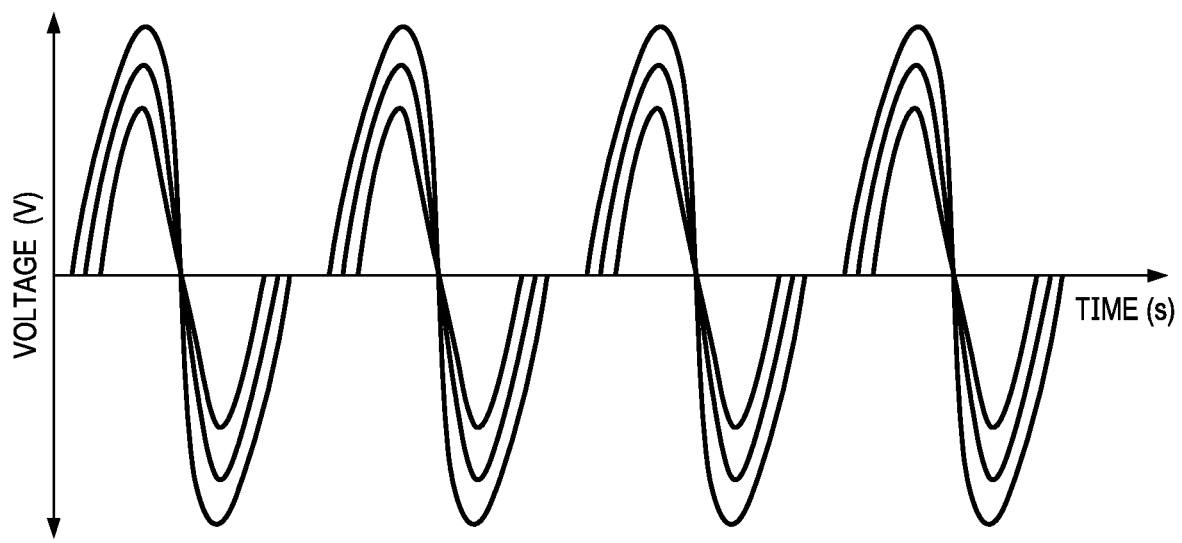
Figure 8C:
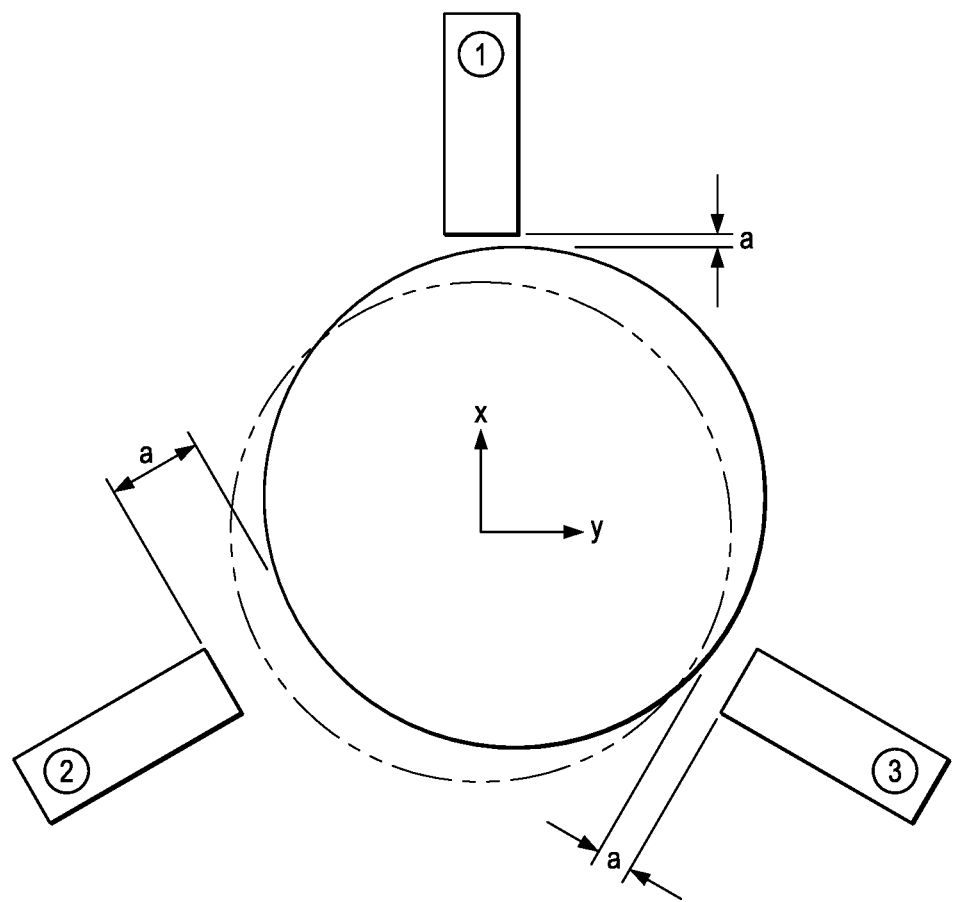
FIG. 8C illustrates an example of shaft misalignment as detected by a system for monitoring various characteristics of a load-bearing rotating shaft in accordance with certain embodiments.
Figure 8C:
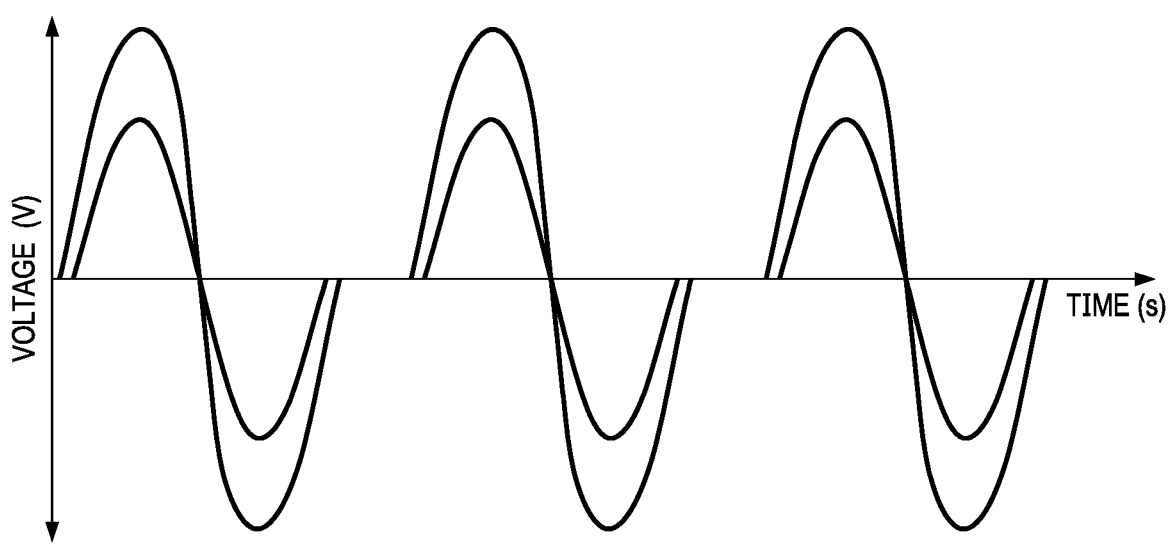

To detect mast misalignment, a minimum of three sensors may be required. In one embodiment, the amplitude of the signals output from the sensors during a constant RPM rotation may be compared with one another. As illustrated in FIG. 8B, nominal, or good, alignment equates to the gaps between the VR sensors and the teeth remaining equal, such that the signal amplitudes remain similar. In contrast, as illustrated in FIG. 8C, a wide variation of amplitudes between/among the VR sensors indicates misalignment. Furthermore, by tracking which VR sensor or sensors produce signals with larger amplitudes and which VR sensor or sensors output signals with smaller amplitudes, one can deduce the direction of misalignment.

Figure 9:
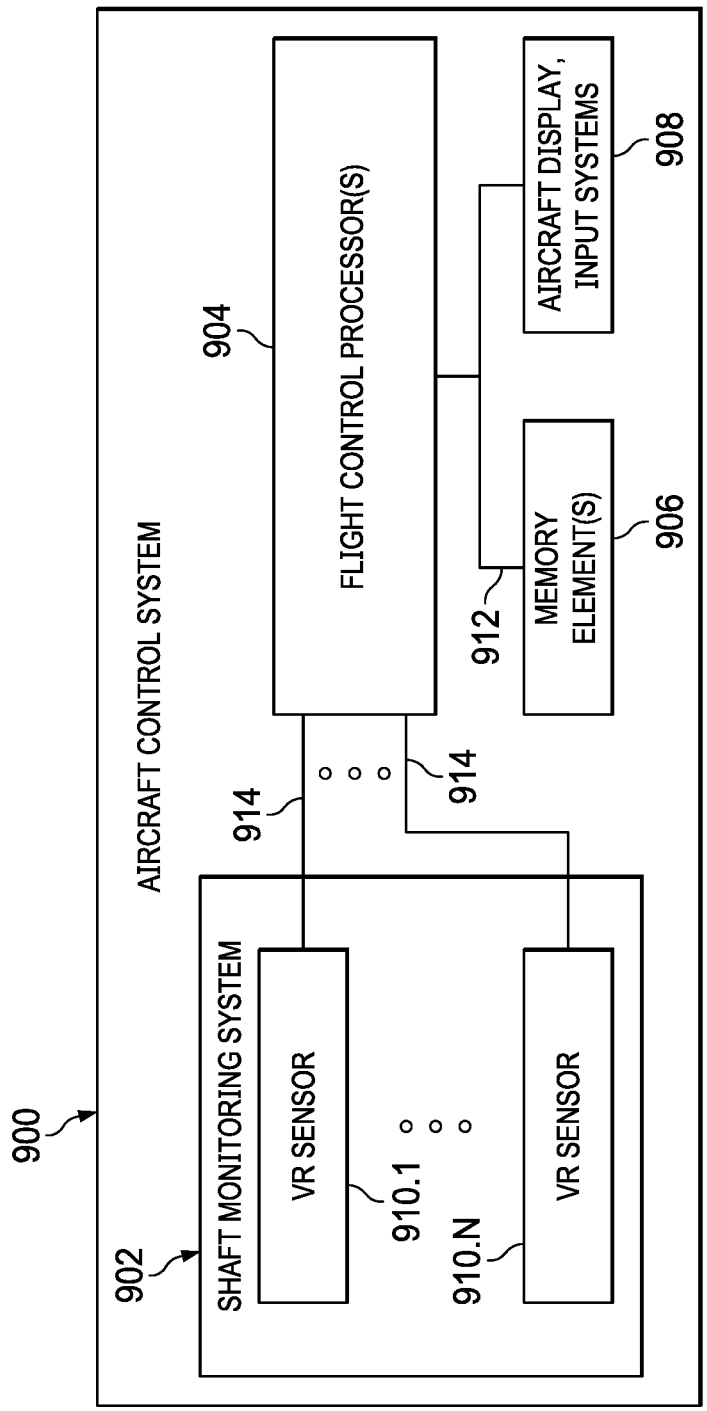
FIG. 9 is a simplified block diagram illustrating example details associated with a system for monitoring various characteristics of a load-bearing rotating shaft in accordance with certain embodiments.

Referring to FIG. 9, illustrated therein is a simplified block diagram of an example aircraft control system 900 for an aircraft in accordance with certain embodiments for implementing a system for monitoring various characteristics of a load-bearing rotating shaft. The aircraft control system 900 can include a shaft monitoring system 902, at least one flight control processor 904, at least one at least one memory element 906, and aircraft display and input systems 908. The shaft monitoring system can 902 include N redundant VR sensors 910.1-910.N. At least one flight control processor 904 can be at least one hardware processor that uses software, firmware, combinations thereof, or the like to execute operations. At least one memory element 906 can store instructions that when executed cause the flight control processor(s) 904 to carry out operations. In various embodiments, aircraft display and input systems 908 can include displays that may provide user interfaces to allow a user, such as a pilot, to interact with the system 900. Such a user interface may include a display device such as a graphical display device (e.g., a plasma display panel (PDP), a liquid crystal display (LCD), a light emitting diode (LED) display, a cathode ray tube (CRT), etc.). In various embodiments, aircraft display and input systems 908 may also include any appropriate input mechanism such as a keyboard, a touch screen, a mouse, a trackball, voice recognition, touch pad, etc. In some embodiments, inputs for input systems can include pilot input generated using a manual control device, an electronic control device, or a combination thereof. In still some embodiments, inputs can be a remote signal received by the aircraft from a ground-based pilot/operator. Other inputs are also contemplated, including inputs from flight controllers, including a cyclic, a collective, and/or pedals. The aircraft control system 900 may be responsive to intended pilot inputs and/or other system inputs.

The system 900 may include one or more buses, such as a system bus and a memory bus, collectively represented in FIG. 9 by a bus 912, for enabling electronic communications between system components. The system 900 may also include one or more communication link(s) 914 for enabling communication between system components (e.g., between sensors 910.1-910.N and flight control processor(s) 904, etc.). In various embodiments, communication link(s) 914 can include wired or wireless communication links (e.g., near field communication (NFC), Bluetooth™, etc.). A flight control processor 904, which may also be referred to as a central processing unit (CPU), can include any general or special-purpose processor capable of executing machine-readable instructions and performing operations on data as instructed by the machine-readable instructions. A memory element 906 may be directly accessible by the hardware processor for accessing machine-readable instructions and may be in the form of random access memory (RAM) or any type of dynamic storage (e.g., dynamic random-access memory (DRAM)). System 900 may also include non-volatile memory, such as a hard disk, that is capable of storing electronic data including executable software files. In some embodiments, externally stored electronic data may be provided to system 900 through one or more removable media drives, which may be configured to receive any type of external media such as compact discs (CDs), digital video discs (DVDs), flash drives, external hard drives, etc.

As used herein, the term "removable media drive" refers to a drive configured to receive any type of external computer-readable media. Instructions embodying activities, functions, operations, etc. described herein may be stored on one or more external and/or internal computer-readable media. Additionally, such instructions may also, or alternatively, reside at least partially within a memory element (e.g., in main memory or cache memory of processor(s) 904 during execution, or within a non-volatile memory element(s) (e.g., one or more memory element(s) 906) of system 900. Accordingly, other memory element(s) 906 of system 900 may also constitute computer-readable media. As referred to herein in this Specification, the term "computer-readable medium" is meant to include any non-transitory computer-readable storage medium (e.g., embedded logic provided in an application specific integrated circuit (ASIC), in digital signal processing (DSP) instructions, software [potentially inclusive of object code and source code], etc.) that is capable of storing instructions for execution by system 900 (e.g., by one or more flight control processor(s) 904) that causes the system to perform any of one or more of the activities, functions, operations, etc. disclosed herein.

In various embodiments, the at least one flight control processor 904 can execute instructions to perform operations to monitoring various characteristics of a load-bearing rotating shaft (e.g., rotor mast 308) and/or to control (e.g., manage and/or adjust), track, and/or otherwise react to those characteristics, which may include torque, RPM, azimuth, torsional anomalies, misalignment, and/or others, for the mast and rotor system, and for the rotor system.

Figure 10:
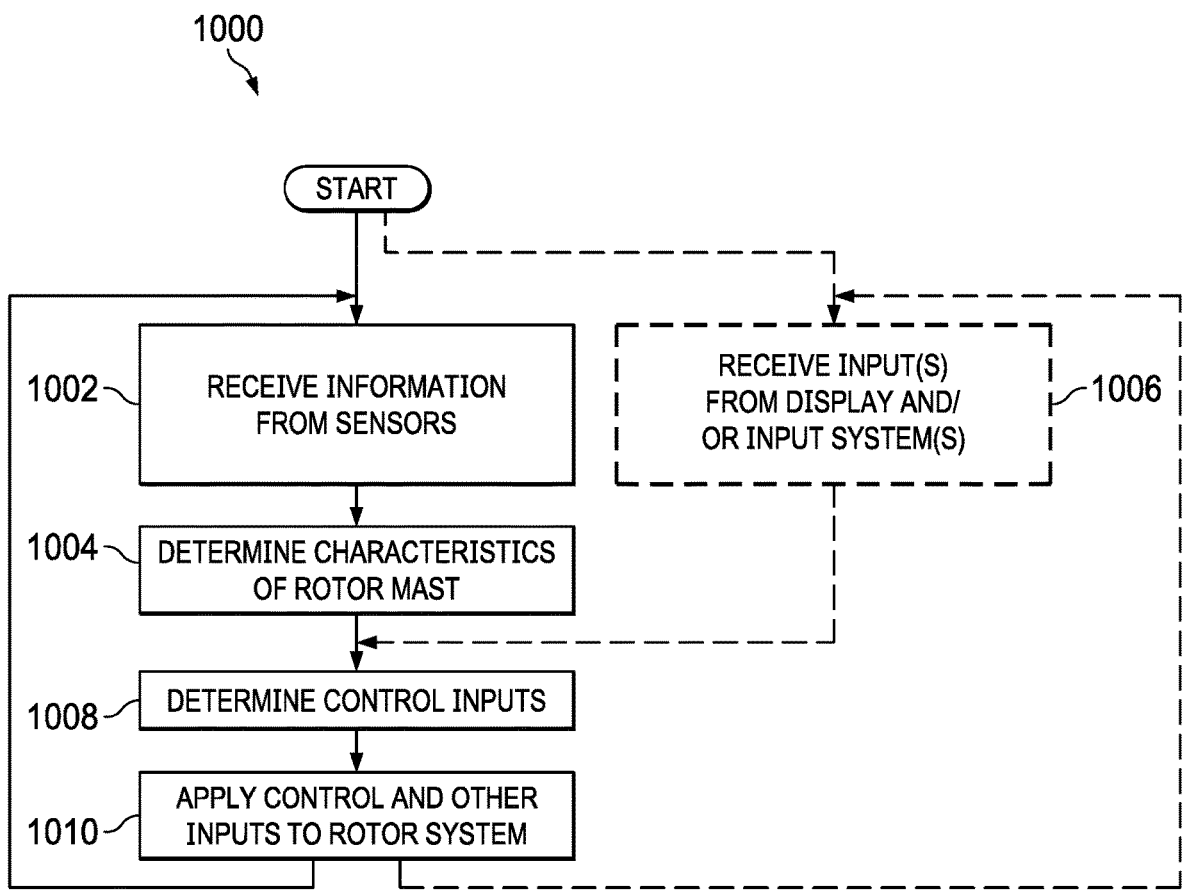
FIG. 10 is a simplified flowchart illustrating example details associated with monitoring various characteristics of a load-bearing rotating shaft in accordance with certain embodiments.

Referring to FIG. 10, illustrated therein is a simplified flowchart 1000 illustrating example details associated with monitoring characteristics of a load-bearing rotating shaft, in accordance with certain embodiments. In at least one embodiment, the operations illustrated in FIG. 10 may be implemented by aircraft control system 900 illustrated in FIG. 9. In at least one embodiment, the flowchart may begin at 1102 in which sensor information can be received from a plurality of redundant sensors of a sensor system. The sensor information may be associated with detection of presence and absence of interleaved teeth passing in front of the sensor. At 1004, characteristics associated with the rotor mast, such as a torque applied to, an RPM of, and/or an azimuth of the rotor mast, can be determined using the sensor information. Other characteristics that may be determined using the sensor information include detecting torsional anomalies and tracking mast misalignment. In some embodiments, input(s) from display(s) and/or input system(s) may additionally be received at 1006. At 1008, various control(s) and adjustments for the rotor system can be determined based on the determined characteristics and additional input(s) received (if applicable). At 1010, operation of the rotor system may be controlled (e.g., managed and/or adjusted) based on the determined controls and adjustments.

The diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus comprising:
   an inner reference tube associated with a load-bearing rotating shaft and having a first set of teeth associated therewith and disposed around a periphery thereof;
   an outer reference tube associated with an input gear and disposed about the inner reference, the outer reference tube and having a second set of teeth associated therewith and disposed around a periphery thereof wherein teeth comprising the second set of teeth are interleaved with teeth comprising the first set of teeth to comprise an interleaved set of teeth and wherein the inner reference tube and the outer reference tube rotate about a same longitudinal axis and at a same speed as the rotating shaft; and
   a sensor system comprising a first variable resistance sensor ("VRS") configured to detect a presence of successive teeth of the interleaved set of teeth and generate an output signal indicative thereof;
   wherein the first set of teeth comprises a gap corresponding to a missing tooth such that the first set of teeth comprises one fewer tooth than the second set of teeth set and wherein the missing tooth corresponds to a zero-degree orientation of the load-bearing rotating shaft such that the output signal generated by the first VRS may be used to determine an azimuth of the load-bearing rotating shaft.

2. The apparatus of claim 1 further comprising an input gear for rotating the load-bearing rotating shaft, the inner reference tube, and the outer reference tube.

3. The apparatus of claim 1, wherein the first VRS comprises a plurality of redundant VRSes.

4. The apparatus of claim 3, wherein the plurality of redundant VRSes are disposed around the interleaved set of teeth and are equidistant from one another.

5. The apparatus of claim 1, wherein the VRS comprises a monopole.

6. The apparatus of claim 1, wherein the load-bearing rotating shaft comprises a rotor mast of a rotorcraft.

7. The apparatus of claim 1, wherein the inner reference tube undergoes an identical torsional force as the load-bearing rotating shaft and wherein a portion of the outer reference tube with which the second set of teeth is associated undergoes no torsional force, such that change in a distance between successive teeth of the interleaved set of teeth as detected by the first VRS and indicated in the output signal correlates to an amount of torque experienced by the load-bearing rotating shaft.

8. The apparatus of claim 1, wherein a material from which the inner reference tube is fabricated comprises at least one of a titanium alloy and a composite material.

9. The apparatus of claim 1, wherein a material from which the outer reference tube is fabricated comprise an aluminum alloy.

10. The apparatus of claim 1, wherein a frequency of the output signal correlates to a speed of the load-bearing rotating shaft in rotations per minute ("RPM").

11. A rotorcraft comprising a system for detecting characteristics of a load-bearing rotating shaft, the system comprising:
    an inner reference tube associated with the load-bearing rotating shaft and having a first set of teeth associated therewith and disposed around a periphery thereof;
    an outer reference tube associated with an input gear and disposed about the inner reference, the outer reference tube and having a second set of teeth associated therewith and disposed around a periphery thereof wherein teeth comprising the second set of teeth are interleaved with teeth comprising the first set of teeth to comprise an interleaved set of teeth and wherein the inner reference tube and the outer reference tube rotate about a same longitudinal axis and at a same speed as the rotating shaft; and
    a sensor system comprising a redundant variable resistance sensors ("VRS") configured to detect a presence of successive teeth of the interleaved set of teeth and generate an output signal indicative thereof;
    wherein the first set of teeth comprises a gap corresponding to a missing tooth such that the first set of teeth comprises one fewer tooth than the second set of teeth set and wherein the missing tooth corresponds to a zero-degree orientation of the load-bearing rotating shaft such that the output signal generated by the first VRS may be used to determine an azimuth of the load-bearing rotating shaft.

12. The rotorcraft of claim 11 further comprising an input gear for rotating the load-bearing rotating shaft, the inner reference tube, and the outer reference tube.

13. The rotorcraft of claim 11, wherein the load-bearing rotating shaft comprises a rotor mast of a rotorcraft.

14. The rotorcraft of claim 11, wherein the inner reference tube undergoes an identical torsional force as the load-bearing rotating shaft and wherein a portion of the outer reference tube with which the second set of teeth is associated undergoes no torsional force, such that change in a distance between successive teeth of the interleaved set of teeth as detected by the first VRS and indicated in the output signal correlates to an amount of torque experienced by the load-bearing rotating shaft.

15. The rotorcraft of claim 11, wherein a frequency of the output signal correlates to a speed of the load-bearing rotating shaft in rotations per minute ("RPM").

16. A method for detecting operational characteristics of a load-bearing rotating shaft, the method comprising:
    providing an inner reference tube associated with the load-bearing rotating shaft and having a first set of teeth associated therewith and disposed around a periphery thereof;
    providing an outer reference tube associated with an input gear and disposed about the inner reference, the outer reference tube and having a second set of teeth associated therewith and disposed around a periphery thereof wherein teeth comprising the second set of teeth are interleaved with teeth comprising the first set of teeth to comprise an interleaved set of teeth and wherein the inner reference tube and the outer reference tube rotate about a same longitudinal axis and at a same speed as the rotating shaft; and providing a sensor system comprising a plurality of redundant variable resistance sensor ("VRSes") disposed around the interleaved set of teeth, wherein each of the VRSes is configured to detect a presence of successive teeth of the interleaved set of teeth and generate an output signal indicative thereof;

wherein the first set of teeth comprises a gap corresponding to a missing tooth such that the first set of teeth comprises one fewer tooth than the second set of teeth set and wherein the missing tooth corresponds to a zero-degree orientation of the load-bearing rotating shaft such that the output signal generated by the first VRS may be used to determine an azimuth of the load-bearing rotating shaft.

17. The method of claim 16 further comprising:

determining a torque experienced by the load-bearing rotating shaft, wherein the torque experienced by the load-bearing shaft correlates to a distance between successive ones of the interleaved teeth as indicated by a phase of the output signal; and determining a speed of the load-bearing rotating shaft, wherein a frequency of the output signal correlates to the speed of the load-bearing rotating shaft.

* * * * *